United States Patent
Murakami

(10) Patent No.: US 10,175,078 B2
(45) Date of Patent: Jan. 8, 2019

(54) CORIOLIS MASS FLOW METER

(71) Applicant: ATSUDEN CO., LTD., Tokyo (JP)

(72) Inventor: Eiichi Murakami, Tokyo (JP)

(73) Assignee: ATSUDEN CO., LTD., Tokyo (JP)

( * ) Notice: Subject to any disclaimer, the term of this patent is extended or adjusted under 35 U.S.C. 154(b) by 0 days.

(21) Appl. No.: 15/869,126

(22) Filed: Jan. 12, 2018

(65) Prior Publication Data

US 2018/0283920 A1    Oct. 4, 2018

(30) Foreign Application Priority Data

Apr. 3, 2017    (JP) .................................. 2017-073745

(51) Int. Cl.
*G01F 1/84*    (2006.01)
(52) U.S. Cl.
CPC .......... *G01F 1/8413* (2013.01); *G01F 1/8422* (2013.01); *G01F 1/8427* (2013.01); *G01F 1/8472* (2013.01)
(58) Field of Classification Search
CPC ........................................................ G01F 1/84
See application file for complete search history.

(56) References Cited

U.S. PATENT DOCUMENTS

| | | | | |
|---|---|---|---|---|
| 8,738,305 | B2 * | 5/2014 | Rieder | G01F 1/8436 |
| | | | | 702/100 |
| 9,086,307 | B2 * | 7/2015 | Hussain | G01F 1/8409 |
| 9,851,239 | B2 * | 12/2017 | Weinstein | G01F 1/002 |
| 9,995,612 | B2 * | 6/2018 | Murakami | G01F 1/8413 |

FOREIGN PATENT DOCUMENTS

JP    1991-041319 A    2/1991

* cited by examiner

*Primary Examiner* — Jewel V Dowtin
(74) *Attorney, Agent, or Firm* — Li & Cai Intellectual Property (USA) Office

(57) ABSTRACT

A holder is mounted on a U-shaped curved tube portion of a measurement tube formed of a synthetic resin, and wing-shaped strips having a plate shape protrude outward from the holder. Distortion caused by a Coriolis force which depends on a flow rate is generated symmetrically with respect to a center line passing through a distal end of the curved tube portion and parallel to an outbound tube and an inbound tube. Therefore, the outbound tube and the inbound tube are twisted about the center line of the holder, and an amount of distortion is enhanced by the wing-shaped strips under the principle of leverage for detection.

12 Claims, 3 Drawing Sheets

CORIOLIS MASS FLOW METER

BACKGROUND OF THE INVENTION

1. Field of the Invention

The present invention relates to a Coriolis mass flow meter with an improved detection sensitivity for a Coriolis force.

2. Description of Related Art

The Coriolis mass flow meter is a flow meter of a system obtaining a mass flow by measuring a coriolis force on the basis of the fact that the coriolis force acting on a mass point of a mass m moving toward or away from a center of rotation of a rotational oscillating system at a velocity V is proportional to a product of the mass m and the velocity V.

The Coriolis mass flow meter has various superior characteristics such as being capable of obtaining a mass flow directly, having no mechanically movable portion which causes abrasion, being superior in maintainability, and being capable of measuring a density in principle by measuring the number of oscillations of the measurement tube compared with differential, electromagnetic, and volumetric flow meters.

For example, JP-A-3-41319 discloses a Coriolis mass flow meter using a U-shaped measurement tube as illustrated in FIG. 6. The measurement tube is composed of a single U-shaped measurement tube 1, and the cantilevered U-shaped measurement tube 1 repeatedly oscillates upward and downward about points of fixation via mounting flanges 2a and 2b at a resonant frequency applied thereto.

Fluid to be measured flowing into the measurement tube 1, when flowing from an inlet port toward a curved portion of a U shape, causes distortion of the measurement tube 1 by a Coriolis force generated by a flowing velocity with respect to the measurement tube 1, and when flowing from the curved tube portion toward an outlet port as indicated by arrows, causes distortion of the measurement tube 1 in an opposite direction by the Coriolis force, so that oscillations of the measurement tube 1 are generated.

An oscillator 3 is provided at a distal end of the measurement tube 1, which forms the U shape, and displacement detection sensors 5a and 5b are mounted on an outbound tube 4a and an inbound tube 4b of the measurement tube 1 at both sides of the curved portion.

Fluid to be measured is flowed into the measurement tube 1, and the oscillator 3 is driven to oscillate the measurement tube 1. A Coriolis force of Fc=−2 mω×v, where ω is an angular speed of the oscillator 3 in a direction of oscillation and v is a flow velocity of the fluid to be measured, works, and the mass flow may be measured by detecting an amplitude of the oscillation which is proportional to the Coriolis force Fc by using the displacement detection sensors 5a and 5b and calculating the detected result.

In the Coriolis mass flow meter of the related art detects variations in distortion caused by a Coriolis force in the outbound tube 4a and the inbound tube 4b of the measurement tube, for example, photoelectrically. However, flow rate values may not be obtained with sufficient degree of accuracy because the degree of displacement is too small.

SUMMARY OF THE INVENTION

In order to solve the above-described problem, it is an object of the invention to provide a Coriolis mass flow meter in which displacement of a measurement tube caused by a Coriolis force is enlarged by using a principle of leverage, so that detection sensitivity is improved.

Means for Solving the Problem

In order to achieve the object described above, an aspect of the invention provides a Coriolis mass flow meter including: a measurement tube having a curved tube portion that allows fluid to be measured to flow in one direction; an oscillation exciter unit configured to provide the measurement tube with oscillations; and a displacement detection unit configured to detect a Coriolis force by displacement of the measurement tube at two points of the measurement tube, the two points being located on an outbound tube and an inbound tube, wherein wing-shaped strips configured to enhance the displacement protrude outward of each of the outbound tube and the inbound tube, and the displacement detection unit detects the displacement occurred when the fluid to be measured flows in the measurement tube and enhanced by the two wing-shaped strips.

According to the Coriolis mass flow meter of the invention, detection sensitivity is improved by enhancing the Coriolis force generated in the measurement tube by the wing-shaped strips protruding sideward from the measurement tube and detecting the enhanced Coriolis force.

DETAILED DESCRIPTION OF THE PREFERRED EMBODIMENTS

The invention will be described in detail with reference to Examples illustrated in FIG. 1 to FIG. 5.

Example 1

Figure 1:
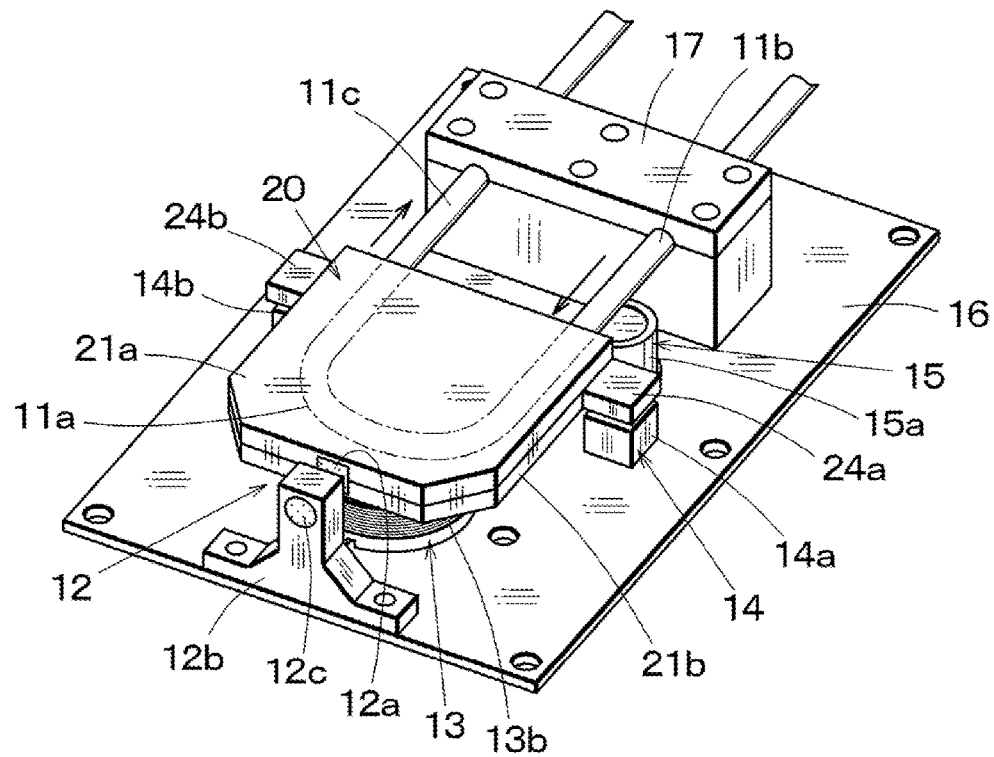
FIG. 1 is a perspective view of a Coriolis mass flow meter according to Example 1.
Figure 2:
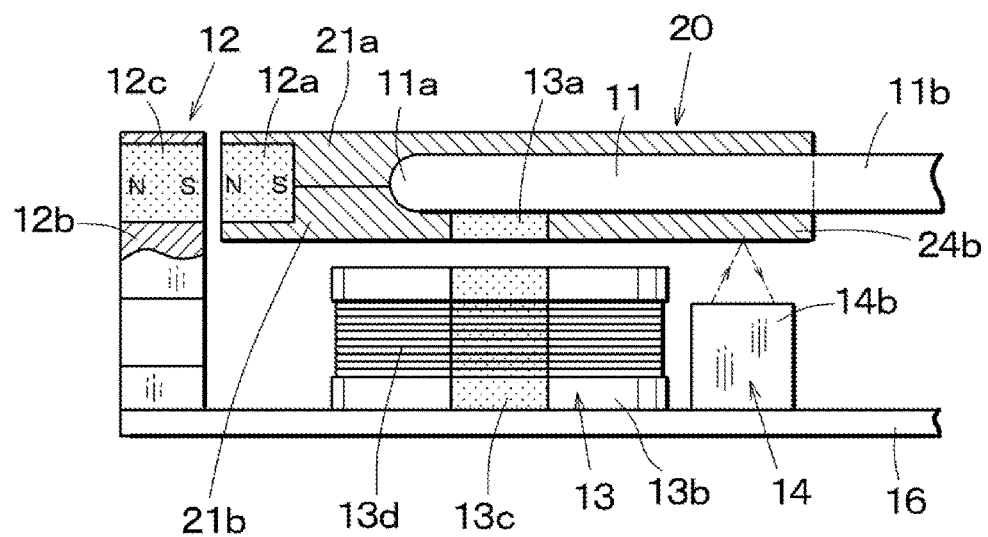
FIG. 2 is an enlarged cross-sectional view of a principal portion of the coriolis mass flow meter.

FIG. 1 is a perspective view of a Coriolis mass flow meter according to Example 1, and FIG. 2 is an enlarged cross-sectional view of a principal portion. The Coriolis mass flow meter mainly includes: a measurement tube 11 which allows fluid to be measured to flow in one direction; a magnetic coupling portion 12 that retains the measurement tube 11 at a predetermined position at a space apart therefrom by magnetic coupling; an oscillation exciter unit 13 configured to oscillate the measurement tube 11; a displacement detection unit 14 configured to detect displacement of the measurement tube 11; a temperature measuring unit 15 configured to measure the temperature of the fluid to be measured, and a calculation control unit, which is not illustrated, configured to input and output a detection signal and a control signal with respect to the units described above and calculate a flow rate of the fluid to be measured.

The measurement tube 11 is formed of a synthetic resin tube, for example, a fluorine resin tube having a diameter of, for example, 3.2 mm, and a U-shaped curved tube portion 11a at a center portion thereof. If the fluid to be measured has no corrosive property, the measurement tube 11 may be a normal synthetic resin tube instead of the fluorine resin tube. However, the measurement tube 11 may need to be formed of a material having an elastic modulus which provides hardness that can transmit a oscillation sufficiently and not flexible. The diameter and other properties of the measurement tube 11 given above are examples only, and the measurement tube 11 having a given diameter may be used, or the measurement tube 11 may be a metallic tube.

Two parallel portions of an outbound tube 11b and an inbound tube 11c of the measurement tube 11 connected by the curved tube portion 11a provided therebetween are clamped by a housing 17 disposed on the substrate 16, so that the measurement tube 11 is fixed to the housing 17. Therefore, part of the measurement tube 11 on the curved tube portion 11a side from the fixed positions is a free end which is not mechanically supported.

Figure 3:
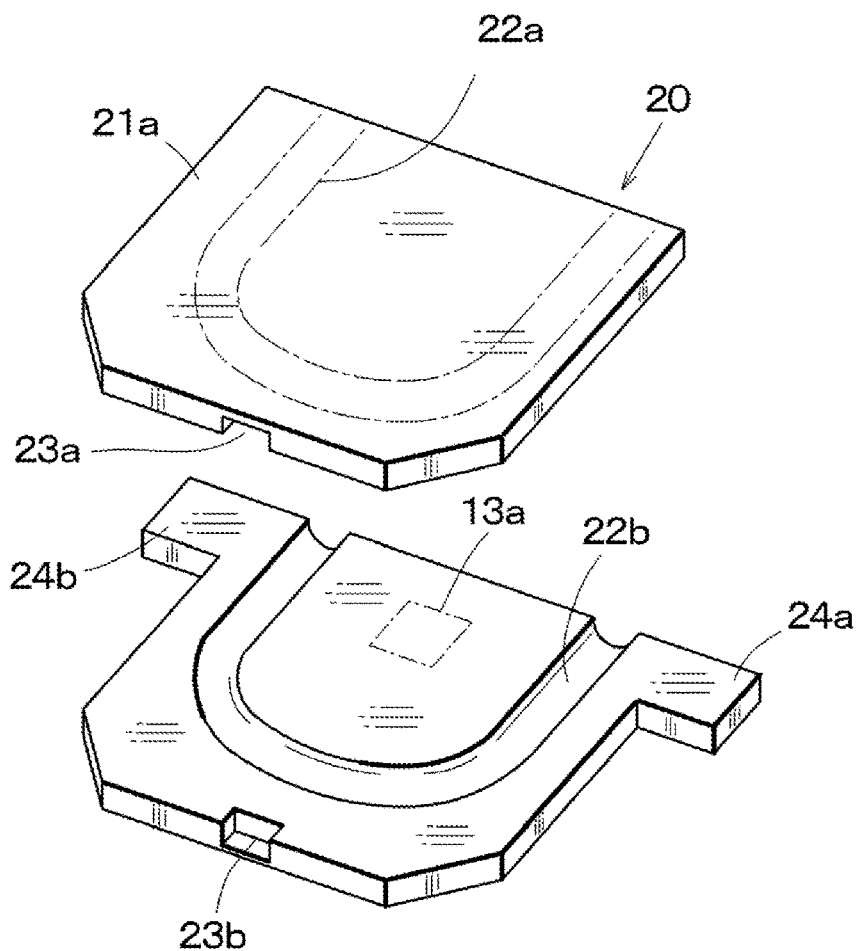
FIG. 3 is a perspective view of a holder.

A synthetic resin made holder 20 to be used in an overlapped manner, for example, as illustrated in FIG. 3, is mounted on the curved tube portion 11a of the measurement tube 11, and the holder 20 includes a pair of plate-shaped upper member 21a and lower member 21b. The holder 20 has a function to prevent deformation of the curved tube portion 11a when the rigidity of the measurement tube 11 is not sufficient.

The upper member 21a and the lower member 21b are provided respectively with groove portions 22a and 22b having a semicircular cross section on mating surfaces thereof and forming the same shape as the curved tube portion 11a when mated. When the upper member 21a and the lower member 21b are mated and fixed to each other from both upper and lower sides of the curved tube portion 11a, the outbound tube 11b, and the inbound tube 11c, the curved tube portion 11a is interposed between the upper member 21a and the lower member 21b and is accommodated in the groove portions 22a and 22b.

The upper member 21a and the lower member 21b are provided respectively with depressed portions 23a and 23b at distal end sides thereof, and a magnetomotive body 12a which functions as part of the magnetic coupling portion 12 is disposed in the depressed portions 23a and 23b. The magnetomotive body 12a may be a permanent magnet with a magnetic pole surface facing forward, or a ferromagnetic body such as iron, cobalt, nickel, or an alloy thereof. An oscillation exciter 13a, which is a magnetomotive body functioning as part of the oscillation exciter unit 13, is embedded at a center on a lower surface of the lower member 21b. One of the lower member 21b and the upper member 21a is further provided with plate shaped wing-shaped strips 24a and 24b protruded on both sides of the outbound tube 11b and the inbound tube 11c.

When fixing the holder 20 on the curved tube portion 11a, the outbound tube 11b, and the inbound tube 11c in this manner, a problem that the curved tube portion 11a may bow downward due to the weight of the holder 20 may arise. Therefore, the curved tube portion 11a is preferably held remotely by a magnetic attraction force of the magnetic coupling portion 12.

In order to do so, the holder 20 is provided with the magnetomotive body 12a disposed thereon, and a magnetism retaining portion 12b formed of a synthetic resin is provided on the substrate 16 at a position facing the magnetomotive body 12a at a distance therefrom. The magnetism retaining portion 12b is provided with a permanent magnet 12c at a position facing the magnetomotive body 12a of the holder 20. The permanent magnet 12c is formed of a strong, for example, neodymium magnet, which functions as part of the magnetic coupling portion 12 and has the magnetic pole surface facing the magnetomotive body 12a.

When the magnetomotive body 12a is a permanent magnet, magnetic poles facing each other are opposite poles, i.e., the S-pole and the N-pole face each other. Therefore, the permanent magnet 12c of the magnetism retaining portion 12b of the magnetic coupling portion 12 serves to retain the curved tube portion 11a of the measurement tube 11 with a space apart therefrom by magnetic coupling by strongly attracting the magnetomotive body 12a with a magnetic attraction force. Alternatively, a configuration in which an electromagnetic coil is disposed on the magnetism retaining portion 12b to cause electromagnetic coupling with the magnetomotive body 12a and generate a magnetic attraction force is also applicable.

In this manner, the curved tube portion 11a of the measurement tube 11 is strongly attracted toward the magnetism retaining portion 12b. Therefore, the curved tube portion 11a is retained at a predetermined position by the magnetism retaining portion 12b, and even when fluid to be measured is poured into the measurement tube 11, the curved tube portion 11a does not bow downward with the weight of the holder 20 and the fluid to be measured, and the position of the curved tube portion 11a of the measurement tube 11 is retained without change.

The oscillation exciter unit 13 configured to generate a coriolis force in the measurement tube 11 is provided on the substrate 16. An electromagnetic coil 13b, which is an electromagnet, is provided on the substrate 16 below the oscillation exciter 13a on a lower surface of the holder 20, and constitutes the oscillation exciter unit 13 configured to oscillate the measurement tube 11 in cooperation with the oscillation exciter 13a.

Electricity is supplied to a coil 13d wound around an iron core 13c of the electromagnetic coil 13b while switching the direction of current, and the direction of magnetic flux generated from an end of the iron core 13c is switched, whereby a magnetic attraction force and a magnetic repulsive force act on the oscillation exciter 13a repeatedly. Accordingly, a predetermined oscillation may be applied to the measurement tube 11 via the oscillation exciter 13a and the holder 20 without contact.

The oscillation is preferably applied to a center position of lateral symmetry of the measurement tube 11. The frequency of oscillation is a resonance frequency or an integral multiple of the measurement tube 1 in a state in which the measurement tube 11 is filled with the fluid to be measured, and normally, is several tens to several hundreds Hz obtained by auto tuning, and is different depending on the elastic modulus, the shape, and the type of the fluid to be measured of the measurement tube 11.

Since the amplitude of oscillation applied by the oscillation exciter unit 13 is minute, the measurement tube 11 may be oscillated even though the measurement tube 11 is retained by the magnetic coupling portion 12. An oscillation exciter mechanism other than the electromagnetic coil 13b may be employed in the oscillation exciter unit 13. The oscillation exciter 13a may be formed of a ferromagnetic body such as iron, cobalt, nickel or an alloy thereof instead of the permanent magnet.

The magnitude of the displacement caused by oscillation of the measurement tube 11 during measurement of the flow rate, that is, an amount of distortion caused by the Coriolis force is transmitted to the wing-shaped strips 24a and 24b via the holder 20. In order to detect the amount of distortion, light receiving and emitting portions 14a and 14b of a displacement detection unit 14 are disposed respectively on the substrate 16 below the wing-shaped strips 24a and 24b of the holder 20.

In each of the displacement detection units 14, light beam from the light receiving and emitting portions 14a and 14b is directed toward the wing-shaped strips 24a and 24b, which correspond to a light reflecting portion, and reflected light therefrom is received by the light receiving and emitting portions 14a and 14b, so that the positional displacement of the reflected light is detected. The detected positional displacement is used for measuring a change in distance from the light receiving and emitting portions 14a and 14b to the wing-shaped strips 24a and 24b, that is, a change in distance, which corresponds to displacement from the light receiving and emitting portions 14a and 14b to the outbound tube 11b and the inbound tube 11c.

Distortion due to the Coriolis force occurs in the outbound tube 11b and the inbound tube 11c symmetrically with respect to a center line passing through the distal end of the curved tube portion 11a and parallel to the outbound tube 11b and the inbound tube 11c, and the distortion occurs so as to twist the outbound tube 11b and the inbound tube 11c about a center line of the holder 20. Therefore, the twisting amount is enhanced by the light receiving and emitting portions 14a and 14b by using the wing-shaped strips 24a and 24b under the principle of leverage for detection. As the calculating methods for calculating the flow rate based on the displacement are known, the description will be omitted.

The longer the wing-shaped strips 24a and 24b, the more effectively the amount of distortion is detected because the amount of distortion is enhanced under the principle of leverage for detection. By using the wing-shaped strips 24a and 24b, the detection sensitivity is significantly improved in comparison with a case of detecting the displacement of the measurement tube 11 itself as-is without using the wing-shaped strips 24a and 24b.

Although the displacement detection unit 14 is configured to measure the distance by a method of detecting the positional displacement using the wing-shaped strips 24a and 24b, the distance may be detected based on a blurring detecting method, or an optical interferometry, and the like by using the wing-shaped strips 24a and 24b. Alternatively, for example, a displacement detector of an electromagnetic system that detects displacement at a space apart therefrom by using the wing-shaped strips 24a and 24b may be used instead of the light-detecting method. However, since the light detecting method does not apply a force to the measurement tube 11, a minute coriolis force is not affected, so that measurement of the flow rate with high degree of accuracy is enabled.

The temperature measuring unit 15 that measures the temperature of the fluid to be measured in the measurement tube 11 by a photoelectric detection unit at a space apart therefrom is disposed on the substrate 16 below the measurement tube 11. When the measurement tube 11 is warmed up or cooled down by the temperature of the fluid to be measured, the elastic modulus varies, and the resonance oscillation frequency or a surface of distortion of the measurement tube 11 minutely varies. Therefore, the temperature of the fluid in the measurement tube 11 is preferably measured in order to correct these variations. Necessity of measurement of the fluid to be measured by using the temperature measuring unit 15 is eliminated if the temperature of the fluid to be measured is measured at a position other than the Coriolis mass flow meter.

Figure 4:
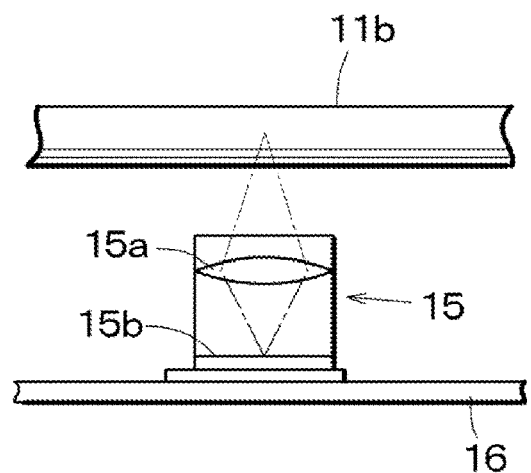
FIG. 4 is a configuration drawing of a temperature measuring unit.

FIG. 4 is a configuration drawing of, for example, an infrared thermometer, used as the temperature measuring unit 15, and the temperature measuring unit 15 includes a lens optical system 15a and a temperature sensing device 15b. The lens optical system 15a optically conjugates the fluid to be measured in the measurement tube 11 formed of a transparent or opaque synthetic resin and the temperature sensing device 15b by an obtained infrared ray. The temperature sensing device 15b senses infrared ray which depends on the temperature of the fluid in the measurement tube 11 via a wavelength selecting optical filter, which is not illustrated, and measures the temperature at a distance without contact.

In Example 1, the magnetic coupling portion 12 elastically attracts and retains the curved tube portion 11a by a magnetic attraction force of the permanent magnet 12c with respect to the magnetomotive body 12a, and the oscillation exciter unit 13 oscillates the measurement tube 11 via the oscillation exciter 13a. Even when the measurement tube 11 is formed of an easily deformable material, the shape of the curved tube portion 11a is maintained by the upper member 21a and the lower member 21b, and thus the measurement tube 11 is not deformed and stable measurement of the flow rate is enabled.

Example 2

Figure 5:
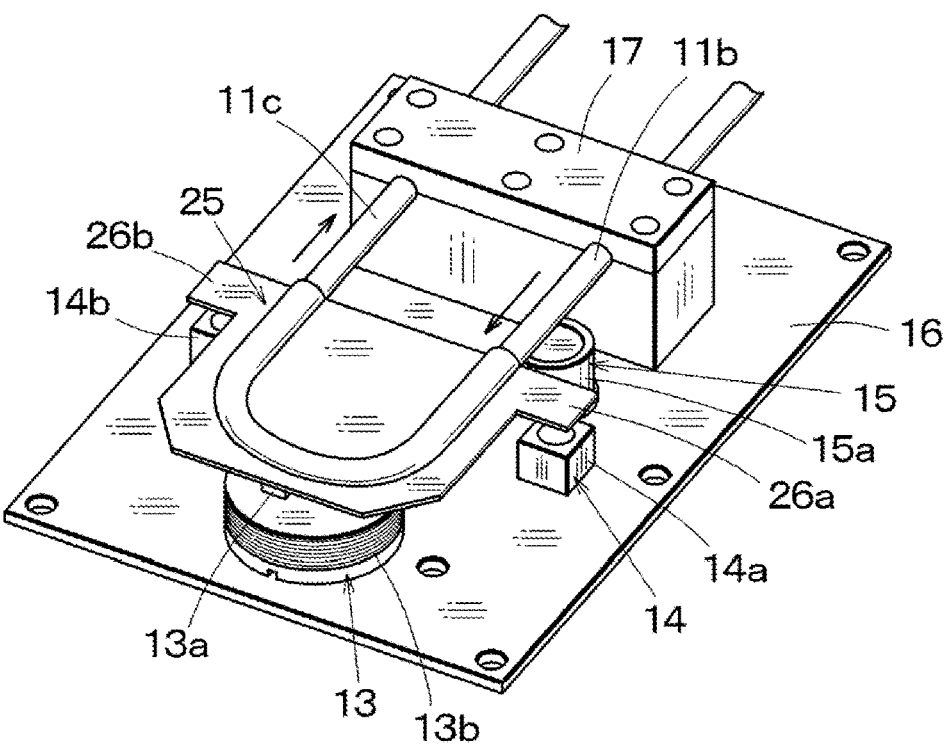
FIG. 5 is a perspective view of a Coriolis mass flow meter according to Example 2.
Figure 6:
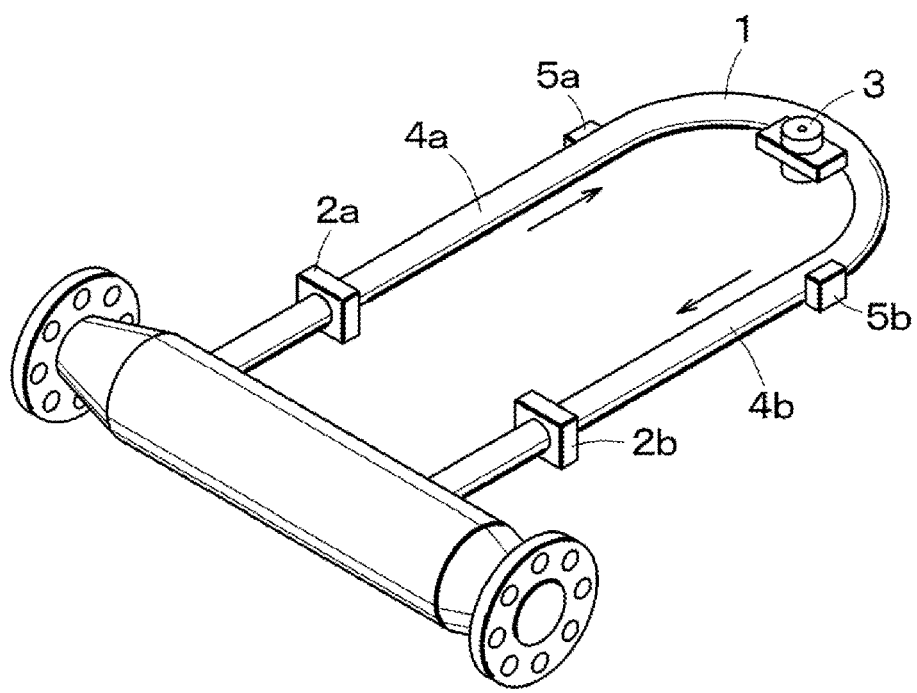
FIG. 6 is a perspective view of an example of the related art.

FIG. 5 is a perspective view of a Coriolis mass flow meter according to Example 2. The same reference numerals as those in Example 1 denote the same members.

A holder 25 that retains the outbound tube 11b and the inbound tube 11c is formed, for example, of a single aluminum plate for weight reduction, and is adhered to an upper side (or a lower side) of the outbound tube 11b and the inbound tube 11c. Wing-shaped strips 26a and 26b protrude outward on both sides of the holder 25. An oscillation exciter of the oscillation exciter unit 13 is mounted on the lower side of the holder 25.

In Example 2 as well, the principle of generation of the Coriolis force is the same as Example 1, and the Coriolis force may be detected easily by the displacement detection unit 14 by being enhanced as displacement of the wing-shaped strips 26a and 26b by the light receiving and emitting portions 14a and 14b.

In Examples 1 and 2, the wing-shaped strips are provided via the holder. However, for example, the wing-shaped strips formed of a synthetic resin may be provided directly on the outbound tube 11b and the inbound tube 11c.

The terms "up" and "down" or "above" and "below" indicate the direction or position in the drawings, and are not necessarily "up" and "down" or "above" and "below" in the actual apparatus.

What is claimed is:

1. A Coriolis mass flow meter comprising:
   a measurement tube having a curved tube portion that allows fluid to be measured to flow in one direction;
   an oscillation exciter unit configured to provide the measurement tube with oscillations; and
   a displacement detection unit configured to detect a Coriolis force by displacement of the measurement tube at two points of the measurement tube, the two points being located on an outbound tube and an inbound tube, wherein
   wing-shaped strips configured to enhance the displacement protrude outward of each of the outbound tube and the inbound tube, and the displacement detection unit detects the displacement occurred when the fluid to be measured flows in the measurement tube and enhanced by the two wing-shaped strips.

2. The Coriolis mass flow meter according to claim 1, wherein the wing-shaped strips protrude outward from a holder mounted on to the outbound tube and the inbound tube in a plate shape.

3. The Coriolis mass flow meter according to claim 1, wherein the wing-shaped strips extending outward are mounted respectively on the outbound tube and the inbound tube.

4. The Coriolis mass flow meter according to claim 1, wherein the displacement detection unit detects displacement of the wing-shaped strip at a distance apart therefrom.

5. The Coriolis mass flow meter according to claim 2, wherein the displacement detection unit detects displacement of the wing-shaped strip at a distance apart therefrom.

6. The Coriolis mass flow meter according to claim 3, wherein the displacement detection unit detects displacement of the wing-shaped strip at a distance apart therefrom.

7. The Coriolis mass flow meter according to claim 4, wherein the displacement detection unit is a photoelectric detection unit.

8. The Coriolis mass flow meter according to claim 5, wherein the displacement detection unit is a photoelectric detection unit.

9. The Coriolis mass flow meter according to claim 6, wherein the displacement detection unit is a photoelectric detection unit.

10. The Coriolis mass flow meter according to claim 2, wherein the holder is provided with a magnetomotive body that functions as part of the oscillation exciter unit mounted thereon.

11. The Coriolis mass flow meter according to claim 2, wherein the magnetomotive body is disposed at a distal end of the holder to cause a magnetic attraction force to act against a magnetic body disposed in front of the tube portions at a distance therefrom and hold the curved tube portion at a distance apart therefrom.

12. The Coriolis mass flow meter according to claim 10, wherein the magnetomotive body is disposed at a distal end of the holder to cause a magnetic attraction force to act against a magnetic body disposed in front of the tube portions at a distance therefrom and hold the curved tube portion at a distance apart therefrom.

\* \* \* \* \*